United States Patent Office 3,053,789
Patented Sept. 11, 1962

---

3,053,789
SOLUTIONS OF ACRYLONITRILE POLYMERS IN PHENOLSULFONIC ACIDS
Hobson D. De Witt, New Wilmington, Pa., assignor, by mesne assignments, to Monsanto Chemical Company, a corporation of Delaware
No Drawing. Filed Mar. 11, 1960, Ser. No. 14,171
16 Claims. (Cl. 260—30.8)

This invention relates to new compositions of matter. More particularly the invention relates to new compositions of matter comprising acrylonitrile polymers and solvents therefor.

Polymers of acrylonitrile are known to be useful for the production of shaped articles such as fibers and films. The conventional method for the manufacture of fibers and films involves the dissolution of the polymer in a suitable solvent and thereafter extruding the viscous solution through the proper opening into a medium which removes the solvent and precipitates the acrylonitrile polymer in a continuous form. Many proposed solvents are impractical due to the cost or the toxic nature of the solvent and to the tendency of the solution to gel upon standing, especially at elevated temperatures encountered in the spinning operation. Also, most acrylonitrile fibers produced by prior methods are not white in color, but have an undesirable brownish color which requires further treatment and materially lowers the uniformity and strength of the fibers. A solvent which overcomes these diffculties would, therefore, be very useful in the manufacture of end products from acrylonitrile polymers.

Accordingly, it is an object of this invention to provide new and useful compositions of matter comprising acrylonitrile polymers. Another object of the present invention is to provide an improved method of forming fibers of high tensile strength and desirable elongation. A further object is to provide solutions of polymers of acrylonitrile which can be advantageously used in the formation of shaped articles by conventional methods. It is still another object of the invention to provide a new and useful solvent for dissolving acrylonitrile polymers. Other objects and advantages of the present invention will be apparent from the description thereof hereinafter.

In general the objects of the present invention are accomplished by mixing the polymer of acrylonitrile with phenolsulfonic acid. The mixture is then heated, preferably with stirring or other agitation, until a free-flowing, uniform, homogeneous solution is obtained. The phenolsulfonic acid solutions of acrylonitrile polymers are clear and homogeneous and readily susceptible to being formed and/or drawn into fibers, films, and the like, by known and conventional procedures.

The solvents which may be used in practicing the instant invention are the unsubstituted phenolsulfonic acids, such as para-phenolsulfonic acid, meta-phenolsulfonic acid and ortho-phenolsulfonic acid. These solvents generally function as solvents for acrylonitrile polymers at temperatures of from about 75° C. to the boiling point of the mixture, depending on the concentration of polymer in the polymer solvent mixture.

The maximum solids concentration of the acrylonitrile polymers that can be obtained in the solution and the viscosity of the solution depend upon the nature of the acrylonitrile polymer, the solvent mixture and the temperature. In the manufacture of filaments and fibers, an acrylonitrile polymer having a molecular weight of at least 10,000 is employed in making a solution. Lower molecular weight acrylonitrile polymers may be used when the solution is to be employed as a coating or as a lacquer. Solutions containing up to 15 percent by weight of polyacrylonitrile are possible, and for the purpose of forming fibers and films, solutions containing from about 5 to 15 percent by weight of polyacrylonitrile are preferred.

The acrylonitrile polymers useful in the practice of the instant invention include not only polyacrylonitrile, but also acrylonitrile copolymers and interpolymers, such as a copolymer of from 70 to 98 percent by weight of acrylonitrile and from 2 to 30 percent of another copolymerizable monoolefinic monomer. The invention is particularly useful with fiber-forming polymers containing at least 80 percent acrylonitrile and up to 20 percent of another copolymerizable mono-olefinic monomer, or a blend comprising polyacrylonitrile or copolymers comprising acrylonitrile with from 2 to 50 percent of another polymeric material, the blend having an overall polymerized acrylonitrile content of at least 80 percent by weight. The invention is likewise applicable to polymers containing less than 80 percent acrylonitrile, which are useful in forming films, coating compositions, molding operations, lacquers, etc. Suitable copolymerizable mono-olefinic monomers include acrylic, alpha-chloracrylic and methacrylic acids, the acrylates, such as methylmethacrylate, ethylmethacrylate, butylmethacrylate, methoxymethyl methacrylate, beta-chloroethyl methacrylate, and the corresponding esters of acrylic and alpha-chloroacrylic acids; vinyl chloride, vinyl fluoride, vinyl bromide, vinylidene chloride, 1-chloro-1-bromoethylene; methacrylonitrile; acrylamide and methacrylamide; alpha-chloroacrylamide, or monoalkyl substitution products thereof; methyl vinyl ketone; vinyl carboxylates, such as vinyl acetate, vinyl chloroacetate, vinylpropionate, and vinyl stearate; N-vinylimides, such as N-vinylphthalimide and N-vinylsuccinimide; methylene malonic esters; itaconic acid and itaconic esters; N-vinyl carbazole; vinyl furane; alkyl vinyl esters; vinyl sulfonic acid, ethylene alpha, beta-dicarboxylic acids or their anhydrides or derivatives, such as diethylcitraconate, diethylmesaconate; styrene; vinyl naphthalene; vinyl-substituted tertiary heterocyclic amines, such as the vinylpyridines and alkyl-substituted vinylpyridines, for example, 2-vinylpyridine, 4-vinylpyridine, 2-methyl-5-vinylpyridine, and the like; 1-vinylimidazole and alkyl-substituted 1-vinylimidazoles, such as 2-, 4-, or 5-methyl-1-vinylimidazole, vinylpyrrolidone, vinylpipenidone, and other mono-olefinic copolymerizable monomeric materials.

The polymer can be a ternary interpolymer, for example, products obtained by the interpolymerization of acrylonitrile and two or more of any of the monomers, other than acrylonitrile, enumerated above,. More specifically, and preferably, the ternary polymers contain from 80 to 98 percent of acrylonitrile, from 1 to 10 percent of a vinylpyridine or a 1-vinylimidazole, and from 1 to 18 percent of another copolymerizable mono-olefinic substance, such as methacrylonitrile, vinyl acetate, methylmethacrylate, vinyl chloride, vinylidene chloride, and the like.

The polymer can also be a blend of polyacrylonitrile or a copolymer of from 80 to 99 percent acrylonitrile and from 1 to 20 percent of at least one other mono-olefinic copolymerizable monomeric substance with from two to fifty percent of the weight of the blend of a copolymer of from 30 to 90 percent of a vinyl substituted tertiary heterocyclic amine and from 10 to 70 percent of at least one other mono-olefinic copolymerizable monomer. Preferably, when the polymeric material comprises a blend, it will be a blend of from 80 to 99 percent of a copolymer of 80 to 98 percent acrylonitrile and from 2 to 20 percent of another mono-olefinic monomer, such as vinyl acetate, which is not receptive to dyestuff, with from 1 to 20 percent of a copolymer of from 30 to 90 percent of a vinyl-substituted tertiary heterocyclic amine, such as a vinyl-pyridine, a 1-vinylimidazole, or a vinyl lactam, and from 10 to 70 percent of acrylonitrile to give a dyeable blend having an overall vinyl-substituted tertiary heterocylic amine content of from 2 to 10 percent, based on the weight of the blend. The optimum proportions can best be determined by selecting a uniform molecular weight polymer having good fiber-forming properties and dissolving it in the smallest amount of solvent necessary to form a viscous solution capable of extrusion at convenient temperatures.

In the practice of this invention, as it is in the preparation of all acrylonitrile fibers, the molecular weight of the polymer is of critical importance. The polymer should have a molecular weight in excess of 10,000 and preferably in excess of 25,000. These molecular weights are determined by measuring the viscosity of the polymer when dissolved in a suitable solvent, such as dimethylformamide, in the manner well known to the art.

The polymers, useful in the practice of the instant invention, may be prepared by any conventional polymerization procedures, such as mass polymerization methods, solution polymerization methods, or aqueous emulsion procedures. The preferred practice utilizes suspension polymerization wherein the polymer is prepared in finely divided form for immediate use in the fiber fabrication operations. Batch, semi-continuous or any preferred procedure may be utilized.

The polymerization is catalyzed by means of any water-soluble peroxy compound, for example the potassium, ammonium and other water-soluble salts of peroxy acids, sodium peroxide, hydrogen peroxide, sodium perborate, the sodium salts of other peroxy acids, and any other water-soluble compound containing a peroxy group (—O—O—). A wide variation in the quantity of peroxy compound is possible. For example, from 0.1 to 3.0 percent by weight of the polymerizable monomer may be used. The catalyst may be charged at the outset of the reaction, or it may be added continuously or in increments throughout the reaction for the purpose of maintaining a more uniform concentration of catalyst in the reaction mass. The latter method is preferred because it tends to make the resultant polymer more uniform in its chemical and physical properties.

The following examples are illustrative rather than limitative. In the examples all parts and percents are by weight unless otherwise indicated.

*Example I*

1 gram of a 94–6 acrylonitrile-vinyl acetate copolymer and 9 grams of para-phenolsulfonic acid were intimately mixed and warmed with stirring to 80° C. After 15 min. a clear, viscous solution was obtained which was suitable for extrusion into water or dioxane for the formation of fibers or films.

*Example II*

1 gram of polyacrylonitrile was mixed, at room temperature, with 9 grams of para-phenolsulfonic acid. The mixture was heated with stirring to 80–85° C. and held at this temperature for 10 min., then the mixture was degassed in a vacuum desicator and held at 80–85° C. for 3 more minutes. The resultant solution was viscous and spinnable.

*Example III*

1 gram of a 94–6 acrylonitrile-methyl acrylate copolymer and 9 grams of para-phenolsulfonic acid were mixed and heated with stirring to 80–85° C. After 15 minutes a clear viscous spinnable solution was obtained.

It will be understood to those skilled in the art that many apparently widely different embodiments of this invention can be made without departing from the spirit and scope thereof. Accordingly, it is to be understood that this invention is not to be limited to the specific embodiments thereof except as defined in the appended claims.

I claim:

1. A new composition of matter, comprising a solution of from 85 to 95 percent by weight of para-phenolsulfonic acid and from 5 to 15 percent of a polymer of at least 80 percent acrylonitrile and up to 20 percent of at least one other copolymerizable mono-olefinic monomer.

2. A new composition of matter, comprising a solution of from 85 to 95 percent by weight of an unsubstituted phenolsulfonic acid and from 5 to 15 percent of a copolymer of from 80 to 98 percent by weight of acrylonitrile and from 2 to 20 percent of another copolymerizable mono-olefinic monomer.

3. A new composition of matter as defined in claim 2 wherein the copolymerizable mono-olefinic monomer is vinyl acetate.

4. A new composition of matter as defined in claim 2 wherein the copolymerizable mono-olefinic monomer is a vinylpyridine.

5. A new composition of matter as defined in claim 2 wherein the copolymerizable mono-olefinic monomer is vinyl chloride.

6. A new composition of matter as defined in claim 2 wherein the copolymerizable mono-olefinic monomer is methyl methacrylate.

7. A new composition of matter as defined in claim 2 wherein the copolymerizable mono-olefinic monomer is methacrylonitrile.

8. A new composition of matter, comprising a solution of from 85 to 95 percent by weight of para-phenolsulfonic acid and from 5 to 15 percent of a copolymer of from 80 to 98 percent by weight of acrylonitrile and from 2 to 20 percent of vinyl acetate.

9. A new composition of matter, comprising a solution of from 85 to 95 percent by weight of an unsubstituted phenolsulfonic acid and from 5 to 15 percent of a blend of 80 to 99 percent of (A) a copolymer of at least 80 percent acrylonitrile and up to 20 percent of another copolymerizable mono-olefinic monomer and 1 to 20 percent of (B) a copolymer of from 30 to 90 percent of a vinylpyridine and from 10 to 70 percent of another copolymerizable mono-olefinic monomer.

10. A new composition of matter, comprising a solution of from 85 to 95 percent by weight of para-phenolsulfonic acid and from 5 to 15 percent of a blend of 80 to 99 percent of (A) a copolymer of at least 80 percent of acrylonitrile and up to 20 percent of another copolymerizable mono-olefinic monomer and 1 to 20 percent of (B) a copolymer of from 30 to 90 percent of a vinylpyridine and from 10 to 70 percent of acrylonitrile.

11. A new composition of matter, comprising a solution of from 85 to 95 percent by weight of para-phenolsulfonic acid and from 5 to 15 percent of a blend of (A) a copolymer of at least 80 percent by weight of acrylonitrile and up to 20 percent of vinyl acetate and (B) a copolymer of from 10 to 70 percent by weight of acrylonitrile and from 30 to 90 percent of 2-methyl-5-vinylpyridine, said blend being so proportioned that the 2-methyl-5-vinylpyridine comprises from 2 to 10 percent by weight of the blend.

12. A method for preparing a new composition of matter comprising mixing from 5 to 15 percent of a polymer containing in polymerized form at least 80 percent of acrylonitrile and up to 20 percent of at least one copolymerizable mono-olefinic monomer, and from 85 to 95 percent of an unsubstituted phenolsulfonic acid, and heating the mixture to form an homogeneous solution.

13. The method defined in claim 12 wherein the polymer is a blend of 80 to 99 percent of (A) a copolymer containing from 80 to 98 percent of acrylonitrile and 2 to 20 percent of a copolymerizable mono-olefinic monomer and 1 to 20 percent of (B) a copolymer containing 10 to 70 percent of acrylonitrile and 30 to 90 percent of a vinyl-substituted tertiary heterocyclic amine, said blend being so proportioned that the vinyl-substituted tertiary heterocyclic amine comprises from 2 to 10 percent by weight of the blend.

14. A method for preparing a new composition of matter comprising mixing a copolymer containing from 80 to 98 percent of acrylonitrile and from 2 to 20 percent of vinyl acetate, and an unsubstituted phenolsulfonic acid and heating the mixture to a temperature of from 75° C. to the boiling point of said mixture to form a homogeneous solution.

15. A method for preparing a new composition of matter comprising mixing a polymer blend of 80 to 99 percent of (A) a copolymer containing 80 to 98 percent of acrylonitrile and 2 to 20 percent of vinyl acetate and 1 to 20 percent of (B) a copolymer containing 10 to 70 percent of acrylonitrile and 30 to 90 percent of 2-methyl-5-vinylpyridine, said blend being so proportioned that the 2-methyl-5-vinylpyridine comprises from 2 to 10 percent by weight of blend, and an unsubstituted phenolsulfonic acid and heating the mixture to a temperature of from 75° C. to the boiling point of said mixture to form an homogeneous solution.

16. A new composition of matter, comprising a solution of from 85 to 95 percent of an unsubstituted phenolsulfonic acid and from 5 to 15 percent of a polymer containing in polymerized form at least 80 percent acrylonitrile and up to 20 percent of at least one copolymerizable mono-olefinic monomer.

References Cited in the file of this patent

UNITED STATES PATENTS

| | | |
|---|---|---|
| 2,404,717 | Houtz | July 23, 1946 |
| 2,503,245 | Coover et al. | Apr. 11, 1950 |
| 2,706,185 | Kowolik | Apr. 12, 1955 |

OTHER REFERENCES

Ellis: "Chemistry of Synthetic Resins," Reinhold Pub. Co., New York, 1935, pages 1098–1099.